United States Patent Office 3,056,896
Patented Oct. 2, 1962

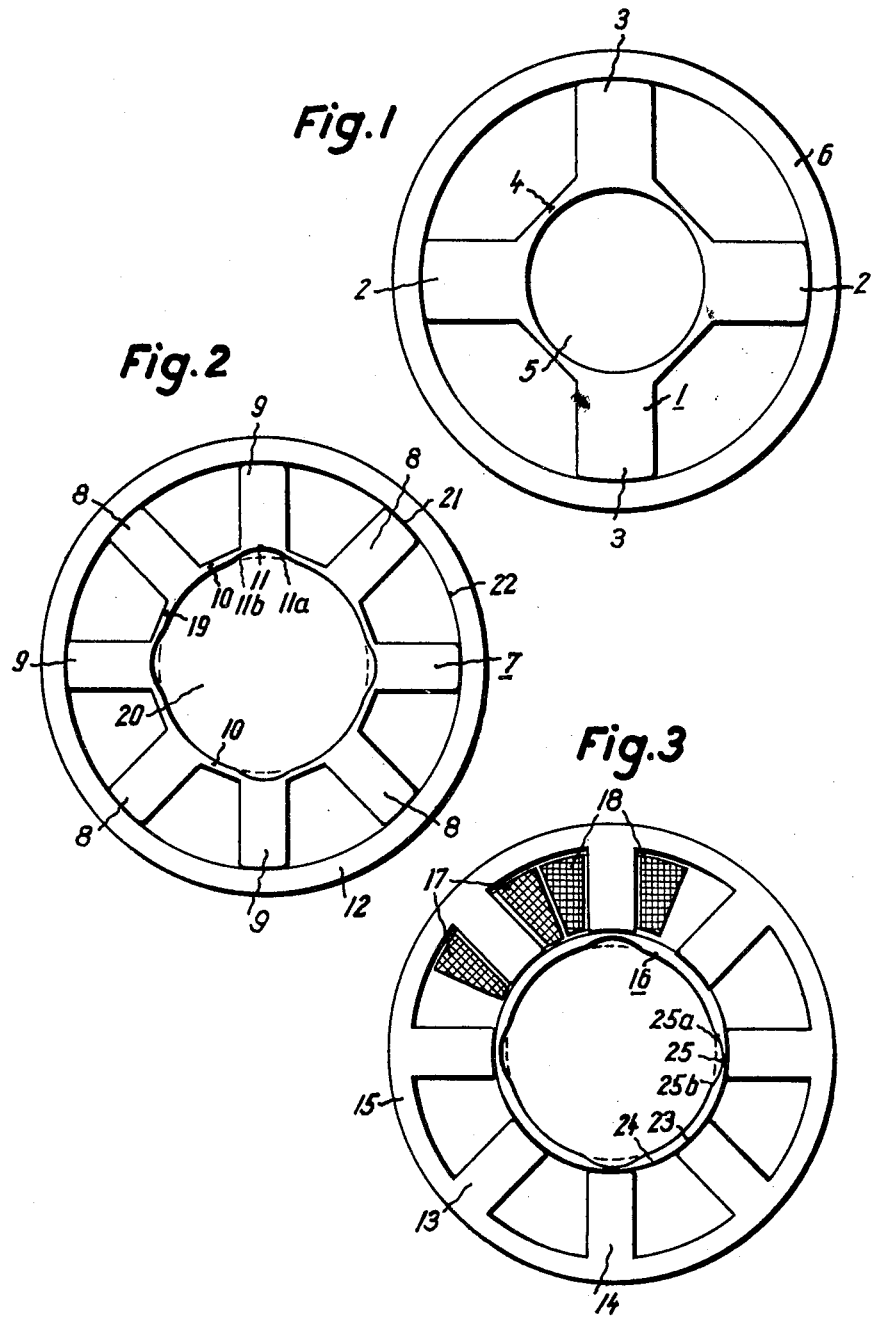

3,056,896
STATOR FOR A.C. MOTOR
Joseph Ludemann and Heinz Heilmann, Oldenburg, Germany, assignors to Licentia Patent-Verwaltungs-G.m.b.H., Frankfurt am Main, Germany
Filed Nov. 3, 1959, Ser. No. 850,620
Claims priority, application Germany Nov. 10, 1958
6 Claims. (Cl. 310—258)

The present invention relates to alternating current motors. More in particular, the present invention relates to stators in single- or polyphase alternating current motors having a plurality of salient poles arranged in pairs, and wherein the number of such pairs is greater than 1.

It is known to provide different types of stators for small single- or polyphase asynchronous motors having not more than one pair of salient poles. The most commonly employed type of stator comprises leakage bridge portions between the respective edges of the poles.

It has also become known to use stators with an improved structure in asynchronous motors with not more than one pair of salient poles, according to which a laminated star-shaped pole structure bearing the magnetic coils is pressed into a stator yoke. According to still another improved structure a laminated pole ring is disposed in the pole bore. The application of these improved structures to A.C.-motors with more than one pair of salient poles has met, however, with considerable prejudice. As a matter of fact, the high magnetic stray effect has proved to be prohibitive of the application of the afore-mentioned structures, as the electrical properties of the motors provided with such stators were highly unsatisfactory.

With the foregoing in mind it is the object of the present invention to provide a structurally improved stator for single- or polyphase alternating current motors with a plurality of salient poles arranged in pairs, comprising more than one pair of salient poles, wherein the magnetic stray flux is greatly reduced.

This object is achieved by the present invention wherein the air gap between the stator and the rotor is enlarged in the area of the auxiliary poles. This can be done by providing the inwardly directed portions of the auxiliary poles with a recess.

Preferably, the recess extends on either side of the auxiliary poles into part of the adjoining bridge portions. The thickness of the bridge portions is kept as small as possible and preferably does not exceed approximately 0.8 millimeter.

This invention will be further described with reference to the accompanying drawings, wherein FIGURE 1 is a sectional view of a conventional bipolar stator with a star-shaped salient pole arrangement;

FIGURE 2 is a sectional view of a four-pole stator of the present invention with a star-shaped pole arrangement;

FIGURE 3 is a sectional view of a four-pole stator of the present invention with a pole-ring.

Referring now to the drawings more in detail and turning first to FIGURE 1, the conventional stator comprises a yoke ring 6 and an inner spider 1 i.e. a star-shaped pole structure forming a separate unit not connected with yoke 6. The inner spider 1 is tightly fitted into the yoke ring 6 and has two main poles 2 disposed opposite to each other, two auxiliary poles 3 also disposed opposite to each other, and four leakage bridge portions connecting the various poles with one another. The inwardly extending pole and bridge portions define a circle and thus enclose a cylindrical rotor space 5.

Turning now to FIGURE 2, the stator of the present invention is adapted for use with motors having more than one pair of salient poles. As shown in FIGURE 2, the stator of the invention comprises, as a yoke, a yoke ring 12, and an inner spider, i.e. a star-shaped pole structure forming a separate unit. It is tightly fitted into the yoke ring 12.

The inner spider 7 has four main poles 8 and four auxiliary poles 9, the main and auxiliary poles being arranged in oppositely disposed pairs. The poles are connected with one another by the leakage bridge portions 19.

According to the present invention, the air gap between the rotor and the stator is enlarged in the area of the auxiliary poles. As shown in FIGURE 2, the pole surfaces of the auxiliary poles 9 directed towards the rotor space 20 have recesses 11. Due to these recesses 11 the air gap between the stator and the rotor in the rotor space 20 is enlarged. The rotor space is thus defined differently from the conventional rotor space shown in FIGURE 1. Whereas in FIGURE 1 the inwardly directed pole and bridge portions describe, in section, a full circle, the bridge and recessed pole portions of the stator of the invention shown in FIGURE 2 describe, in section, segments of a circle with a plurality of outwardly bulged portions, defining the rotor space 20.

It has been found to be of particular advantage to extend the recessed portions 11 on either side into part of the adjoining bridge portions, as shown in FIGURE 2. The recesses 11 thus extend across the auxiliary poles 9 and, on either side of each auxiliary pole, over a part of each of the adjoining leakage bridge portions 19, as shown by the recess portions 11a, 11b of recess 11.

It is also advantageous to provide laminated bridge portions 19 which have a minimum thickness, preferably not exceeding approximately 0.8 millimeter.

The adjoining surfaces 21, 22 of the poles and the yoke, respectively, can have any desired configuration allowing for the tightly fitting insertion of the inner spider into the yoke.

The basic feature of the invention can be also applied with equal advantages to stators wherein the poles are fixedly connected with the stator yoke. This is shown, for example, in FIGURE 3. The stator has four main poles 13 and four auxiliary poles 14 arranged in oppositely disposed pairs, and provided with main pole windings 17 and auxiliary pole windings 18, respectively. The poles 13 and 14 are fixedly connected with yoke 15, whereas the leakage bridge portions form a laminated pole ring 16, which is a separate structure, but tightly fitted into the yoke and pole portion of the stator. The adjoining surfaces 23, 24 of the poles and the pole ring, respectively can have any desired configuration allowing for the tightly fitting insertion of the pole ring.

According to the invention, the laminated pole ring 16 constituting the leakage bridges between the poles is provided with recesses 25, corresponding to recesses 11 in FIGURE 2, and also preferably extending on either side into part of the adjoining bridge portions 19, as shown by the extended recess portions 25a, 25b.

Again, the thickness bridge portions forming the laminated pole ring 16 are kept as small as possible, and preferably do not exceed 0.8 millimeter.

The invention offers numerous advantages constituting a great progress over the art.

The recesses in the area of the auxiliary poles enlarge the air gap between the stator and rotor which greatly reduces the harmonic waves of the field curve of the auxiliary phase. At the same time, the leakage and main reactances of the auxiliary phase circuit are advantageously modified in the following manner:

The inductive leakage reactance of the auxiliary phase circuit is kept small in case of short-circuit, whereas it is increased in case of no-load operation, in connection with the decrease of the main reactance of the auxiliary phase. Consequently, the mutual capacitance of the auxiliary phase is connected in series with a great leakage inductance in case of no-load operation, whereas it is connected in series with a small leakage inductance in case of short-circuit. The total capacitance in the auxiliary phase circuit is thus variable, i.e. it is comparatively great during the short, but comparatively small under no-load operation. The motor has thus greatly improved starting as well as no-load operation characteristics.

The invention makes it possible to dispense with additional, cumbersome and costly means adapted by the art for adjusting the auxiliary phase circuit, depending on load and number of revolutions. It is, for example, no longer necessary to equip the motor with starting capacitors, centrifugal circuit breakers or relays, controlled transducer connections, saturated iron-core chokes, and the like.

The small thickness of the leakage bridge portions greatly reduces the leakage flux. Since the leakage bridge portions are also laminated, losses due to eddy currents are virtually negligible.

It will be understood that this invention is susceptible to modification in order to adapt it to different usages and conditions and, accordingly, it is desired to comprehend such modifications within this invention as may fall within the scope of the appended claims.

What we claim is:

1. In an alternating current motor having a rotor, a stator comprising a plurality of main salient poles disposed in pairs, said stator having at least one pair of such main salient poles, and a plurality of auxiliary salient poles, said rotor and said stator defining an air gap between each other which is enlarged in radial direction in the area of said auxiliary poles only.

2. In an alternating current motor having a rotor, a stator comprising a plurality of main salient poles disposed in pairs, said stator having at least one pair of such main salient poles, and a plurality of auxiliary salient poles said rotor and said stator defining an air gap between each other, said auxiliary salient poles having a recess at the respective ends directed towards said rotor enlarging the air gap between said rotor and said stator as compared with the corresponding air gap at said main poles.

3. In an alternating current motor having a rotor, a stator comprising a plurality of main salient poles disposed in pairs, said stator having at least one pair of such main salient poles, and a plurality of auxiliary salient poles, said rotor and said stator defining an air gap between each other, a plurality of leakage bridge portions between said main and said auxiliary salient poles, a plurality of recesses being provided in said auxiliary salient poles at the respective ends directed towards said rotor, with the recesses extending at either side of said auxiliary salient poles into said leakage bridge portions, which recesses enlarge the air gap between said stator and said rotor as compared with the air gap between said rotor and said main poles.

4. A stator in an alternating current motor as described in claim 3, further comprising a yoke, said main and said auxiliary salient poles and said leakage bridge portions forming an integral star-shaped structure tightly fitting into said yoke.

5. In an alternating current motor having a rotor, a stator comprising a plurality of main pole teeth disposed in pairs, said stator having one pair of such main pole teeth, and a plurality of auxiliary pole teeth, a yoke portion forming with said main and auxiliary pole teeth one integral structure, and a plurality of leakage bridge portions forming one integral laminated pole ring tightly fitting against the respective ends of said main and said auxiliary pole teeth directed towards said said rotor, said leakage bridge portions forming said pole ring and said rotor defining an air gap between each other, with a plurality of recesses being provided in said leakage bridge portions at the end facing said rotor and the areas below said auxiliary poles, which recesses thus enlarge said air gap only below said auxiliary poles.

6. A stator in an alternating current motor as described in claim 3, said leakage bridge portions being formed as a lamination having a thickness not exceeding 0.8 millimeter.

References Cited in the file of this patent

UNITED STATES PATENTS

| 1,363,167 | Peugeot | Dec. 21, 1920 |
| 1,382,257 | Turbayne | June 21, 1921 |

FOREIGN PATENTS

| 1,040,122 | Germany | Oct. 2, 1958 |